US008906155B2

(12) United States Patent
Gasafi et al.

(10) Patent No.: US 8,906,155 B2
(45) Date of Patent: Dec. 9, 2014

(54) CLINKER SUBSTITUTE BASED ON CALCINED CLAY

(75) Inventors: Edgar Gasafi, Karlsruhe (DE); Michael Missalla, Oberusel (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 14/005,280

(22) PCT Filed: Feb. 24, 2012

(86) PCT No.: PCT/EP2012/053120
§ 371 (c)(1),
(2), (4) Date: Sep. 16, 2013

(87) PCT Pub. No.: WO2012/126696
PCT Pub. Date: Sep. 27, 2012

(65) Prior Publication Data
US 2014/0000491 A1    Jan. 2, 2014

(30) Foreign Application Priority Data
Mar. 18, 2011    (DE) .................. 10 2011 014 498

(51) Int. Cl.
*C04B 7/13* (2006.01)
*C04B 14/10* (2006.01)
*C04B 20/04* (2006.01)
*C04B 28/04* (2006.01)
*C04B 7/52* (2006.01)
*C04B 7/40* (2006.01)
*C04B 111/00* (2006.01)

(52) U.S. Cl.
CPC .................. *C04B 7/522* (2013.01); *C04B 14/10* (2013.01); *C04B 2111/00017* (2013.01); *C04B 7/13* (2013.01); *C04B 28/04* (2013.01); *C04B 20/04* (2013.01); *C04B 7/40* (2013.01)
USPC ........... 106/811; 106/457; 106/486; 501/141; 501/150

(58) Field of Classification Search
USPC .................. 106/486, 811, 457; 501/141, 150
See application file for complete search history.

(56) References Cited

U.S. PATENT DOCUMENTS

| 3,941,872 A |   | 3/1976  | Puskar |  |
|---|---|---|---|---|
| 4,229,391 A |   | 10/1980 | Procter |  |
| 4,419,228 A | * | 12/1983 | Cook et al. ................ 209/9 |
| 4,948,362 A |   | 8/1990  | Baird |  |
| 5,154,766 A | * | 10/1992 | Young ..................... 106/416 |
| 5,624,488 A | * | 4/1997  | Forbus et al. ............. 106/484 |
| 6,379,452 B1 | * | 4/2002 | Maxwell et al. ........... 106/486 |
| 2003/0027708 A1 | * | 2/2003 | Ginn et al. ................ 501/141 |
| 2011/0034318 A1 |   | 2/2011 | Gasafi et al. |  |

FOREIGN PATENT DOCUMENTS

| DE | 1519750 A      | 12/1969 |
| DE | 69010646 T2    | 11/1994 |
| DE | 102008020600 B4 | 10/2009 |
| DE | 102008031165 A1 | 1/2010  |
| EP | 0165034 B1     | 12/1985 |
| EP | 0434461 B1     | 7/1994  |
| EP | 2253600 A1     | 5/2009  |
| WO | WO 2010000383 A1 | 1/2010 |

OTHER PUBLICATIONS

"Integrated Pollution Prevention and Control (IPPC)", Reference Document on Best Available Techniques in the Cement and Lime Manufacturing Industries, European Commission, Brussels, Dec. 1, 2011; Gasafi, E., Jeske, U. and T. Reinhardt, Dec. 1, 2006, "Gipsreduktion mit Kohlenstoff-Rahmenbedingungen für die Verwertung mineralischer Reststoffe mit Sulfat und potentielle Einsatzstoffe für ein GRC-Verfahren", publication series "Wissenschaftliche Berichte Forschungszentrum Karlsruhe in der Helmholtz-Gemeinschaft" FZKA-7189, Karlsruhe.
The Cement $CO_2$ Protocol: $CO_2$ Emissions Monitoring and Reporting, Protocol for the Cement Industry, Working Group Cement of the World Business Council for Sustainable Development (WGC-WBCSD), Oct. 19, 2001, http://www.wbcsdcement.org/pdf/co2-protocol.pdf.
Shvarzman A et al: "The effect of dehydroxylation/amorphiztion degree on pozzolanic activity of kaolinite"; Cement and Cooncrete Research; Pergamon Press, Elmsford; NY, US, vol. 33, No. 3, Mar. 30, 2003, pp. 405-416, XP002585502, ISSN: 0008-8846, chapters 3.1-3-3.
A. Buchwald, et al.: "The suitability of thermally activated illite/smectite clay as raw material for geopolymer binders", Applied Clay Science, vol. 46, No. 3, Nov. 1, 2009, pp. 300-304; XP002675980, chapter; 3 & 4 figure 3.
Johansson S et al: "Pozzolanic Activty of Calcined Moler Clay", Cement and Concrete Research, Pergamon Press, Elmsford, NY, US, vol. 20, No. 3, May 1, 1990, pp. 447-452, XP000942480, ISSN: 0008-8846, DOI: 10.1016/0008-8846 (90) 90035-V, chapters: Experimental & Resultstable 1.
Rodrigo Fernandez, et al: "The origin of pozzolanic activity of calcined clay minerals: A comparison between kaolinite, illite and montmorillonite", Cement and Concrete Research, vol. 41, Jan. 1, 2011, pp. 113-122, XP002675981, chapters: 2 and 3 table 1.
Changling He, et al.: "Thermal stability and pozzolanic activity of calcined illite", Applied Clay Science, vol. 9, Feb. 1, 1995, pp. 337-354. XP002675982, chapter: 3 table 1.
Sabir B B et al: "Metakaolin and calcined clay as pozzolans for concrete: a review", Cement and Concrete Composites, Elsevier Applied Science, Barking; GB; vol. 23, Dec. 1, 2001, pp. 441-454, XP002583266, ISSN: 0958-9465, chapter: 3.
Changling He, et al.: "Thermal stability and pozzolanic activity of calcined kaolin", Applied Clay Science, vol. 9, No. 3, Sep. 1, 1994, pp. 165-187, XP002675979, chapter: 3.1 & 3.2.
Duda, "Cement-Data-Book", International Process Engineering in the Cement Industry, vol. 1, $3^{rd}$ edition, Dec. 1985, p. 4.
Keil. "Zement Herstellung und Eigenschaften", Dec. 1971, p. 51.

* cited by examiner

*Primary Examiner* — Anthony J Green
(74) *Attorney, Agent, or Firm* — Leydig, Voit & Mayer, Ltd.

(57) ABSTRACT

A method for producing a clinker substitute for use in cement production includes predrying clay with an iron content >1.5 wt-% in a form of iron oxides and a kaolinite content <40 wt-% to a moisture <10 wt-%. The clay is comminuted to a grain size <2 mm. The clay is calcined by thermal treatment in a furnace at a temperature of 600 to 1000° C. The clay is thermally treated under reducing conditions at a temperature of 600 to 1000° C. so as to form a reduction product. The reduction product is intermediately cooled to a temperature <300° C. and finally cooled.

19 Claims, 2 Drawing Sheets

CLINKER SUBSTITUTE BASED ON CALCINED CLAY

CROSS-REFERENCE TO PRIOR APPLICATIONS

This application is a U.S. National Phase Application under 35 U.S.C. §371 of International Application No. PCT/EP2012/053120, filed on Feb. 24, 2012, and claims benefit to German Patent Application No. DE 10 2011 014 498.6, filed on Mar. 18, 2011. The International Application was published in English on Sep. 27, 2012 as WO 2012/126696 under PCT Article 21(2).

FIELD

This invention relates to a clinker substitute, methods for producing the same, the use thereof, construction materials such as cement, mortar and concrete containing the clinker substitute, and methods for producing these construction materials.

BACKGROUND

Cement is a hydraulically hardening construction material which consists of a mixture of finely ground, non-metallic inorganic constituents. In general, it is produced by jointly grinding the burnt cement clinker with other major and minor constituents.

The main raw material for clinker production is limestone which is mined in quarries, pre-comminuted in crushers and conveyed into the cement plant. After grinding and drying, it is mixed with other ground components such as sand, clay or iron ore to obtain a raw meal. This raw meal is burnt to clinker in a rotary kiln at temperatures above 1450° C. and then cooled in a cooler to a temperature of below 200° C. Subsequently, the granules obtained are ground to cement in a ball mill together with gypsum or anhydrite (cf. "Integrated Pollution Prevention and Control (IPPC)", Reference Document on Best Available Techniques in the Cement and Lime Manufacturing Industries, European Commission, Brussels, 2011; Gasafi, E., Jeske, U. and T. Reinhardt, 2006, "Gipsreduktion mit Kohlenstoff-Rahmenbedingungen für die Verwertung mineralischer Reststoffe mit Sulfat und potentielle Einsatzstoffe für ein GRC-Verfahren", publication series "Wissenschaftliche Berichte Forschungszentrum Karlsruhe in der Helmholtz-Gemeinschaft" FZKA-7189, Karlsruhe).

According to a study of the World Business Council for Sustainable Development, the cement industry is responsible for about 5% of the global anthropogenic $CO_2$ emissions (cf. "The Cement $CO_2$ Protocol: $CO_2$ Emissions Monitoring and Reporting, Protocol for the Cement Industry, Working Group Cement of the World Business Council for Sustainable Development (WGC-WBCSD), Oct. 19, 2001, http://www.wbcad-cement.org/pdf/co2-protocol.pdf). Since about half of the $CO_2$ emissions during the clinker production are caused by the raw material limestone, the reduction of the clinker content (clinker factor) by replacement of another component can provide a substantial contribution to the reduction of these emissions.

As cement substitute, calcined clay was proposed for example. The calcination of fine-grained mineral solids, such as clay, conventionally is effected in rotary kilns or multiple-hearth roasters. The maintenance of a low temperature at a retention time necessary for the treatment with this method is ensured thereby. The U.S. Pat. No. 4,948,362 for example describes a method for calcining clay, in which kaolin clay is treated in a multiple-hearth roaster by means of a hot calcining gas to increase gloss and minimize abrasiveness. In an electrostatic precipitator, the calcined clay powder is separated from the waste gas of the calcining furnace and processed further, in order to obtain the desired product.

From DE 10 2008 031 165 A1 it is known to use the plant for producing the cement itself for the production of calcined clay, wherein at least two preheating lines are provided, of which one serves for preheating the clay and the other serves for heating clinker raw material. In a combustion chamber hot gases are produced, which serve the calcination of the clay and are guided through the preheating stages in counterflow to the solids.

The clay used in these processes, however, has a high kaolin content of more than 40 wt-% and is very expensive, so that no economically marketable clinker substitute can be produced therefrom.

SUMMARY

In an embodiment, the present invention provides a method for producing a clinker substitute for use in cement production. Clay with an iron content >1.5 wt-% in a form of iron oxides and a kaolinite content <40 wt-% is predried to a moisture <10 wt-%. The clay is comminuted to a grain size <2 mm. The clay is calcined by thermal treatment in a furnace at a temperature of 600 to 1000° C. The clay is thermally treated under reducing conditions at a temperature of 600 to 1000° C. so as to form a reduction product. The reduction product is intermediately cooled to a temperature <300° C. and finally cooled.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
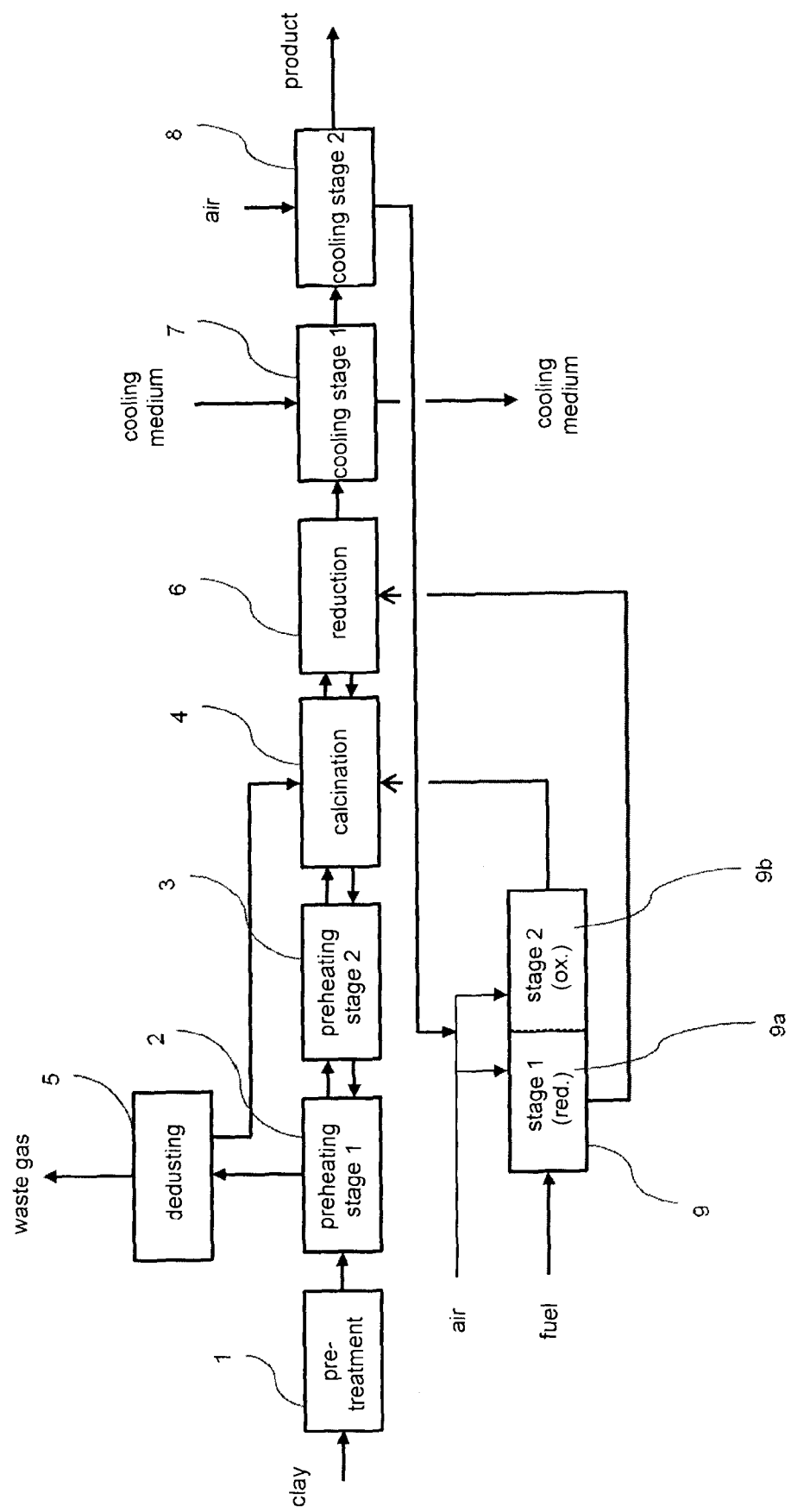
FIG. 1 schematically shows the construction of a plant suitable for carrying out the method according to the invention.

In an embodiment, the present invention provides a less expensive clinker substitute and based thereon less expensive cement, mortar and concrete, which in addition are characterized by a better $CO_2$ balance than conventional construction materials.

In another embodiment, the present invention provides a less expensive way of producing a clinker substitute which in addition is characterized by lower $CO_2$ emissions.

According to an embodiment of the invention, the production of a clinker substitute for use in the cement production is effected in the following steps:

a) predrying clay with an iron content >1.5 wt-% (indicated as $Fe_2O_3$) and a kaolinite content <40 wt-% to a moisture <10 wt-%, preferably <8 wt-% and in particular <6 wt-%, b) comminuting the clay to a grain size <2 mm, preferably <1 mm, c) calcining the clay by thermal treatment in a furnace at a temperature of 600 to 1000° C., preferably 700 to 900° C., d) thermal treatment of the clay under reducing conditions, in particular by adding a CO-containing gas as reducing agent, at a temperature of 600 to 1000° C., preferably 700 to 900° C., wherein the reduction product is obtained, e) intermediate cooling of the reduction product to a temperature <300° C., f) final cooling of the product, preferably directly with air and/or indirectly via cooling water.

In the sense of this description, the term "clay" preferably stands for "natural tempered pozzolan", as defined in the standard DIN EN 197-1 (German version: 2000, items 5.2.3 and 5.2.3.3) or the standard ASTM C618-05 (Class N).

After predrying and comminuting the clay, it is initially calcined at preferably 600 to 900° C., wherein a phase change occurs and a pozzolanically reacting clay of red color is produced. Pozzolans are silicatic and alumosilicatic materials which hydraulically react with calcium hydroxide (lime hydrate) and water and form calcium silicate hydrates and calcium alumina hydrates. These crystals are also obtained during the hardening (hydration) of cement and for example bring about the strength and structural density of concrete. When calcining the clay, the maximum temperatures should be maintained, which upon exceedance thereof involve the risk of material sintering. In addition, at excessive temperatures the pozzolanic reactivity can get lost. In accordance with an embodiment of the invention, a temperature of 900° C. should therefore not be exceeded permanently.

The method according to an embodiment of the invention itself is independent of the CaO content of the clay. For reducing sulfur emissions in a preferred embodiment, the clay used in step a) of the method according to an embodiment of the invention has a CaO content of >0.1 wt-%, preferably >1.0 wt-%. Calcium is present in the raw material (educt) in the form of $CaCO_3$. In the calcining process, it is converted to CaO by $CO_2$-split-off and can bind $SO_2$, which possibly results from the combustion of sulfur-containing fuel, as $CaSO_4$.

By the subsequent reducing treatment with a CO-containing gas, a color change of the red calcined clay to grey calcined clay is effected due to the reaction of the hematite ($Fe_2O_3$) contained in the clay to obtain magnetite ($Fe_3O_4$) according to the equation

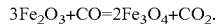

$$3Fe_2O_3+CO=2Fe_3O_4+CO_2.$$

To ensure that this process proceeds sufficiently fast, it should take place at elevated temperatures >600° C., preferably >700° C.

As an inexpensive educt for producing the clinker substitute, a clay with an iron content >1.5 wt-% and preferably <4 wt-% (indicated as $Fe_2O_3$) and a kaolinite content <40 wt-% is used in accordance with an embodiment of the invention.

In accordance with an embodiment of the invention, the intermediate cooling of the reduction product in step e) is effected under oxygen exclusion, since the color is preserved thereby. The grey color of the clay finds high acceptance on the market, as the concrete color is not impaired thereby. In accordance with an embodiment of the invention, cooling can be effected by means of cooling screws, trickle coolers or the like.

In accordance with an embodiment of the invention it is provided that in the region under air exclusion oil can be injected, whereby in addition a reducing atmosphere is achieved, since the oil is gasified due to the high temperatures. Thus, the oil preferably serves to maintain reducing conditions.

The final cooling subsequently can be effected for example in a fluidized-bed cooler, rotary tube cooler or the like with a suitable coolant, e.g. with air.

In accordance with an embodiment of the invention, the calcination in step c) is effected in a fluidized-bed reactor, a rotary kiln, a suspension calciner (flash calciner) with a short retention time between 0.5 and 20 seconds, preferably between 1 second and 10 seconds, and in particular between 2 and 8 seconds, or in a multiple-hearth roaster.

The necessary process heat is provided by the combustion of a fuel, such as natural gas, petroleum or waste fuels. In accordance with an embodiment of the invention, this is effected in an external combustion chamber, wherein the combustion product produced is used for carrying out the thermal treatment in step c) and/or d).

In accordance with a preferred embodiment, the combustion is effected in several stages, wherein the combustion in a first stage is operated under reducing conditions (lambda<1), in order to provide the CO-containing reduction gas for the color change from red to grey in step d). In a second stage, a complete combustion under air excess (lambda>1) then is effected. The hot gas generated here is supplied to the calcining furnace in step c) with a temperature of about 950 to 1200° C.

To make the calcination in step c) more economic, the clay is preheated in one or more preheating stages in accordance with an embodiment of the invention prior to the calcination.

An embodiment of invention provides a clinker substitute containing calcined clay, wherein the calcined clay contains <40 wt-% kaolinite and >1.5 wt-% iron in the form of iron oxides, preferably in the form of magnetite ($Fe_3O_4$). The clinker substitute according to an embodiment of the invention in particular is suitable for the production of cement clinker, cement, mortar or concrete.

In a preferred embodiment, the clinker substitute according to the invention consists of calcined clay, wherein the calcined clay contains <40 wt-% kaolinite and >1.5 wt-% iron in the form of iron oxides, preferably in the form of magnetite ($Fe_3O_4$). In the sense of this invention, the expression "consists of" is to be understood such that the clinker substitute exclusively contains calcined clay, i.e. 100% calcined clay.

In a further preferred embodiment, the clinker substitute contains calcined clay, wherein the calcined clay is derived from hematite-containing clay, and the hematite-containing clay contains >1.5 wt-% iron in the form of hematite ($Fe_2O_3$) and <40 wt-% kaolinite, wherein preferably the calcined clay contains >1.5 wt-% iron in the form of iron oxides, but no iron in the form of hematite ($Fe_2O_3$).

Preferably >90 wt-% of the iron oxides contained in the calcined clay are present as magnetite ($Fe_3O_4$). In a further preferred embodiment, >95 wt-% and in particular >99 wt-% of the iron oxides contained in the calcined clay are present as magnetite ($Fe_3O_4$). In a particularly preferred embodiment of the clinker substitute according to the invention, the calcined clay contains no hematite ($Fe_2O_3$). This means that in the calcined clay the hematite ($Fe_2O_3$) present in the hematite-containing clay preferably is quantitatively converted to magnetite ($Fe_3O_4$).

Preferably, the calcined clay of the clinker substitute according to an embodiment of the invention contains >0.1 wt-% CaO, preferably >1 wt-% CaO.

An additional embodiment of the invention provides for the use of the clinker substitute as partial replacement of Portland cement clinker for the production of Portland cement (CEM I) or Portland additive cement. Mortar and concrete can be produced therefrom.

A further embodiment of the invention provides a cement clinker, preferably Portland cement clinker, which contains the clinker substitute according to an embodiment of the invention.

Preferably, the cement clinker according to an embodiment of the invention contains 60 to 90 wt-% conventional cement clinker and 10 to 40 wt-% clinker substitute, wherein the sum of the weight percentages of the conventional cement clinker and of the clinker substitute is 100 wt-% (the indicated weight percentages here are based on the total mass of the cement clinker).

The cement clinker according to an embodiment of the invention preferably is suitable for the production of construction materials, such as cement, mortar and concrete.

An even further embodiment of the invention relates to a cement, preferably Portland cement or Portland additive cement, which contains the clinker substitute according to an embodiment of the invention.

Preferably, the cement according to an embodiment of the invention contains a cement clinker which contains 60 to 90 wt-% conventional cement clinker (preferably Portland cement clinker) and 10 to 40 wt-% clinker substitute according to the invention, wherein the sum of the weight percentages of the conventional cement clinker and of the clinker substitute according to an embodiment of the invention is 100 wt-% (the indicated weight percentages here are based on the total mass of the cement clinker).

Embodiments of the invention also extend to a mortar or concrete containing the cement according to an embodiment of the invention.

Finally, an embodiment of the invention comprises a method for producing a cement clinker or a construction material containing cement clinker, wherein the construction material preferably is cement, mortar or concrete, comprising the step of: replacing 10 to 40 wt-%, preferably 15 to 35 wt-%, more preferably 20 to 30 wt-%, and in particular 25 wt-% of a conventional cement clinker by the clinker substitute according to an embodiment of the invention.

In a preferred embodiment, the invention comprises a method for producing a construction material containing cement clinker, wherein the construction material preferably is cement, mortar or concrete, comprising the step of: replacing 10 to 40 wt-%, preferably 15 to 35 wt-%, more preferably 20 to 30 wt-% and in particular 25 wt-% of a cement by the clinker substitute according to an embodiment of the invention.

A structure containing the cement according to an embodiment of the invention, the mortar according to an embodiment of the invention and/or the concrete according to an embodiment of the invention also are embodiments, together and in parts, of the present invention.

As starting material of the method according to the invention, clay with an iron content >1.5 wt-% (indicated as $Fe_2O_3$) and a kaolinite content <40 wt-% is used.

The following Table contains an overview of the preferred embodiments (Embodiment A to Embodiment T) concerning the content of iron, CaO and kaolinite, which preferably is contained in the educt:

|   | Wt-% iron (indicated as $Fe_2O_3$) | Wt-% CaO | Wt-% kaolinite |
|---|---|---|---|
| A | >1.5 | >0.1 | <40 |
| B | >1.5 | >0.1 | <35 |
| C | >1.5 | >0.1 | <30 |

-continued

|   | Wt-% iron (indicated as $Fe_2O_3$) | Wt-% CaO | Wt-% kaolinite |
|---|---|---|---|
| D | >1.5 | >0.1 | <25 |
| E | >1.5 | >0.1 | <20 |
| F | >1.5 | >0.1 | <15 |
| G | >1.5 | >0.1 | <10 |
| H | >1.5 | >0.1 | <5 |
| I | >1.5 | >0.1 | <1 |
| J | >1.5 | >0.1 | 0 |
| K | >1.5 | >1 | <40 |
| L | >1.5 | >1 | <35 |
| M | >1.5 | >1 | <30 |
| N | >1.5 | >1 | <25 |
| O | >1.5 | >1 | <20 |
| P | >1.5 | >1 | <15 |
| Q | >1.5 | >1 | <10 |
| R | >1.5 | >1 | <5 |
| S | >1.5 | >1 | <1 |
| T | >1.5 | >1 | 0 |

Further preferred embodiments concerning the content of iron, CaO and kaolinite, which is contained in the educt, are listed in the following Table (Embodiment U to Embodiment Z):

|   | Wt-% iron (indicated as $Fe_2O_3$) | Wt-% CaO | Wt-% kaolinite |
|---|---|---|---|
| U | >1.5 to 4 | >0.1 | <40 |
| V | >1.5 to 4 | >0.1 | <20 |
| W | >1.5 to 4 | >0.1 | <10 |
| X | 2 to 3.5 | >0.1 | <40 |
| Y | 2 to 3.5 | >0.1 | <20 |
| Z | 2 to 3.5 | >0.1 | <10 |

In a pretreatment stage 1, the educt is coarsely comminuted to a grain size of <10 cm in a crusher and dried in a drier to a moisture of <6 wt-%. Subsequently, fine grinding is effected, e.g. in a hammer mill possibly with additional drying, to a grain size <1 mm. In doing so, a narrow grain range should be ensured. When graphically determining the grain size distribution by means of an RRSB diagram (Rosin, Rammler, Bennet and Sperling) according to DIN 66145 the slope n should lie in the range from 1 to 10.

After preheating in one or two preheating stages 2, 3, the clay thus prepared with a temperature of 350 to 600° C. is supplied to a calcining furnace 4, e.g. in the form of a circulating fluidized bed, a rotary kiln, a flash calciner or a multiple-hearth roaster, and calcined there at 600 to 900° C. To the calcining furnace 4, the clay recovered by dedusting 5 the waste gas of the preheating stage 2 and/or 3 can also be supplied.

Subsequent to the calcination, a change in color of the red calcined clay into grey calcined clay is effected under reducing conditions in a reduction furnace 6 (fluidized-bed furnace or rotary kiln), wherein the hematite ($Fe_2O_3$) contained in the clay, which causes the red color, is converted to magnetite ($Fe_3O_4$). The change in color is effected at temperatures >600° C., preferably >700° C.

The reduction product thus obtained is cooled in a first cooling stage 7, for example by means of cooling screws, trickle coolers or the like, under oxygen exclusion down to a temperature <300° C. In addition, oil can be injected, in order to achieve a reducing atmosphere here as well due to the oil gasifying at these temperatures.

Subsequently, a final cooling 8 can be effected in a fluidized bed cooler, rotary tube cooler or the like, for example with air.

Calcined clay is obtained, which can replace 10 to 40 wt-% of the clinker in cement. The $CO_2$ emissions thereby can be reduced by up to 36%.

The necessary process heat is provided by the multi-stage combustion of a fuel in an external combustion chamber 9. In a first stage 9a of this combustion chamber, the combustion process is operated under reducing conditions (lambda<1), in order to provide the reduction gas for the change in color of the calcined clay from red to grey. In the second stage, a complete combustion under air excess (lambda>1) then is effected. The hot gas generated here is supplied to the calcining furnace 4 with a temperature of 950 to 1200° C. Fresh air and/or in the second cooling stage 8 preheated air can be supplied to the combustion chamber 9 as combustion air.

A clinker substitute according to an embodiment of the invention contains calcined clay with <40 wt-% kaolinite and >1.5 wt-% iron in the form of iron oxides, preferably in the form of magnetite ($Fe_3O_4$). The clinker substitute according to an embodiment of the invention in particular is suitable for the production of cement clinker, cement, mortar or concrete.

The calcined clay is derived from hematite-containing clay, wherein the hematite-containing clay contains >1.5 wt-% iron in the form of hematite ($Fe_2O_3$) and <40 wt-% kaolinite. Preferably, however, the calcined clay contains no more iron in the form of hematite ($Fe_2O_3$).

The hematite-containing clay (red clay) has a reddish color due to the hematite ($Fe_2O_3$) contained therein. This reddish color is not present in the calcined clay (grey clay), since red hematite ($Fe_2O_3$) is converted to black magnetite ($Fe_3O_4$). Preferably, the clinker substitute according to the invention is grey.

In a preferred embodiment, the weight ratio of black magnetite ($Fe_3O_4$) to red hematite ($Fe_2O_3$) in the clinker substitute according to an embodiment of the invention or in the calcined clay is such that the clinker substitute according to an embodiment of the invention or the calcined clay does not have a reddish color, but is grey. Corresponding weight ratios can be determined by the skilled person by employing simple routine experiments.

Preferred embodiments (No. 1 to No. 20) as regards the iron content and the kaolinite content, which are contained in the clinker substitute or calcined clay according to an embodiment of the invention, can be taken from the following Table:

| No. | Wt-% iron | Wt-% kaolinite |
|---|---|---|
| 1 | >1.5 | <40 |
| 2 | >1.5 | <35 |
| 3 | >1.5 | <30 |
| 4 | >1.5 | <25 |
| 5 | >1.5 | <20 |
| 6 | >1.5 | <15 |
| 7 | >1.5 | <10 |
| 8 | >1.5 | <5 |
| 9 | >1.5 | <1 |
| 10 | >1.5 | 0 |
| 11 | >1.5 to 4 | <40 |
| 12 | >1.5 to 4 | <35 |
| 13 | >1.5 to 4 | <30 |
| 14 | >1.5 to 4 | <25 |
| 15 | >1.5 to 4 | <20 |
| 16 | >1.5 to 4 | <15 |
| 17 | >1.5 to 4 | <10 |
| 18 | >1.5 to 4 | <5 |
| 19 | >1.5 to 4 | <1 |
| 20 | >1.5 to 4 | 0 |

The content of iron indicated in the above Table refers to the content of iron in the form of iron oxides, preferably to the content of iron in the form of magnetite ($Fe_3O_4$).

Further preferred embodiments (No. 21 to No. 40) as regards the iron content and the kaolinite content, which are contained in the clinker substitute or calcined clay according to the invention, can be taken from the following Table:

| No. | Wt-% iron | Wt-% kaolinite |
|---|---|---|
| 21 | 2 to 3.5 | <40 |
| 22 | 2 to 3.5 | <35 |
| 23 | 2 to 3.5 | <30 |
| 24 | 2 to 3.5 | <25 |
| 25 | 2 to 3.5 | <20 |
| 26 | 2 to 3.5 | <15 |
| 27 | 2 to 3.5 | <10 |
| 28 | 2 to 3.5 | <5 |
| 29 | 2 to 3.5 | <1 |
| 30 | 2 to 3.5 | 0 |
| 31 | 2.5 to 3 | <40 |
| 32 | 2.5 to 3 | <35 |
| 33 | 2.5 to 3 | <30 |
| 34 | 2.5 to 3 | <25 |
| 35 | 2.5 to 3 | <20 |
| 36 | 2.5 to 3 | <15 |
| 37 | 2.5 to 3 | <10 |
| 38 | 2.5 to 3 | <5 |
| 39 | 2.5 to 3 | <1 |
| 40 | 2.5 to 3 | 0 |

The content of iron indicated in the above Table refers to the content of iron in the form of iron oxides, preferably to the content of iron in the form of magnetite ($Fe_3O_4$).

Preferably, >90 wt-% of the iron oxides contained in the calcined clay are present as magnetite ($Fe_3O_4$). In a further preferred embodiment, >95 wt-% and in particular >99 wt-% of the iron oxides contained in the calcined clay are present as magnetite ($Fe_3O_4$).

In a particularly preferred embodiment of the clinker substitute according to the invention, the calcined clay contains no hematite ($Fe_2O_3$). This means that in the calcined clay the hematite ($Fe_2O_3$) present in the hematite-containing clay preferably is quantitatively converted to magnetite ($Fe_3O_4$).

In a preferred embodiment, the calcined clay preferably contains >0.1 wt-% CaO and <50 wt-% CaO, more preferably >0.1 wt-% CaO and <30 wt-% CaO, even more preferably >0.1 wt-% CaO and <20 wt-% CaO, most preferably >0.1 wt-% CaO and <10 wt-% CaO, and in particular >0.1 wt-% CaO and <5 wt-% CaO.

In a preferred embodiment, the calcined clay preferably contains >1 wt-% CaO and <50 wt-% CaO, more preferably >1 wt-% CaO and <30 wt-% CaO, even more preferably >1 wt-% CaO and <20 wt-% CaO, most preferably >1 wt-% CaO and <10 wt-% CaO, and in particular >1 wt-% CaO and <5 wt-% CaO.

Preferred embodiments (No. 41 to No. 60) as regards the iron content, kaolinite content and CaO content, which are contained in the clinker substitute or calcined clay according to the invention, can be taken from the following Table:

| | Wt-% iron | Wt-% kaolinite | Wt-% CaO |
|---|---|---|---|
| 41 | 2 to 3.5 | <40 | 0.1 to 5 |
| 42 | 2 to 3.5 | <35 | 0.1 to 5 |
| 43 | 2 to 3.5 | <30 | 0.1 to 5 |
| 44 | 2 to 3.5 | <25 | 0.1 to 5 |

-continued

|    | Wt-%<br>iron | Wt-%<br>kaolinite | Wt-%<br>CaO |
|----|------|------|---------|
| 45 | 2 to 3.5 | <20 | 0.1 to 5 |
| 46 | 2 to 3.5 | <15 | 0.1 to 5 |
| 47 | 2 to 3.5 | <10 | 0.1 to 5 |
| 48 | 2 to 3.5 | <5  | 0.1 to 5 |
| 49 | 2 to 3.5 | <1  | 0.1 to 5 |
| 50 | 2 to 3.5 | 0   | 0.1 to 5 |
| 51 | 2.5 to 3 | <40 | 0.5 to 3 |
| 52 | 2.5 to 3 | <35 | 0.5 to 3 |
| 53 | 2.5 to 3 | <30 | 0.5 to 3 |
| 54 | 2.5 to 3 | <25 | 0.5 to 3 |
| 55 | 2.5 to 3 | <20 | 0.5 to 3 |
| 56 | 2.5 to 3 | <15 | 0.5 to 3 |
| 57 | 2.5 to 3 | <10 | 0.5 to 3 |
| 58 | 2.5 to 3 | <5  | 0.5 to 3 |
| 59 | 2.5 to 3 | <1  | 0.5 to 3 |
| 60 | 2.5 to 3 | 0   | 0.5 to 3 |

The content of iron indicated in the above Table refers to the content of iron in the form of iron oxides, preferably to the content of iron in the form of magnetite ($Fe_3O_4$).

In a particularly preferred embodiment, the calcined clay of the clinker substitute according to the invention contains 2 to 3.5 wt-% iron in the form of magnetite ($Fe_3O_4$), no hematite ($Fe_2O_3$), <25 wt-% kaolinite, and 0.25 to 1.5 wt-% CaO.

In a preferred embodiment, no limestone is added to the clay, preferably to the hematite-containing clay. The content of CaO in the clinker substitute according to an embodiment of the invention hence results from the calcium salts such as $CaCO_3$ contained in the clay itself. In a further preferred embodiment, no kaolin is added to the clay, preferably to the hematite-containing clay. The content of kaolinite in the clinker substitute according to an embodiment of the invention hence results from the salts present in the clay itself.

In two particularly preferred embodiments (Embodiment 61 and Embodiment 62), the hematite-containing clay comprises the following components:

| Component | Embodiment 61 | Embodiment 62 |
|-----------|---------------|---------------|
| $SiO_2$   | 60 to 80 wt-% | 65 to 75 wt-% |
| $TiO_2$   | 0.5 to 3 wt-% | 1 to 2 wt-%   |
| $Al_2O_3$ | 10 to 30 wt-% | 15 to 25 wt-% |
| $Fe_2O_3$ | >1.5 to 5 wt-% | 2 to 3.5 wt-% |
| CaO       | 0.1 to 3 wt-% | 0.4 to 2 wt-% |
| MgO       | 0.1 to 2 wt-% | 0.1 to 1.2 wt-% |
| $K_2O$    | 0.5 to 3 wt-% | 0.5 to 2 wt-% |
| $Na_2O$   | 0.1 to 2 wt-% | 0.1 to 1 wt-% |

In two particularly preferred embodiments (Embodiment 63 and Embodiment 64), the clinker substitute or calcined clay according to the invention comprises the following components:

| Component | Embodiment 63 | Embodiment 64 |
|-----------|---------------|---------------|
| $SiO_2$   | 60 to 80 wt-% | 65 to 75 wt-% |
| $TiO_2$   | 0.5 to 3 wt-% | 1 to 2 wt-%   |
| $Al_2O_3$ | 10 to 30 wt-% | 15 to 25 wt-% |
| $Fe_2O_3$ | 0 wt-%        | 0 wt-%        |
| $Fe_3O_4$ | >1.5 to 5 wt-% | 2 to 3.5 wt-% |
| CaO       | 0.1 to 3 wt-% | 0.4 to 2 wt-% |
| MgO       | 0.1 to 2 wt-% | 0.1 to 1.2 wt-% |
| $K_2O$    | 0.5 to 3 wt-% | 0.5 to 2 wt-% |
| $Na_2O$   | 0.1 to 2 wt-% | 0.1 to 1 wt-% |

The indication contained in the above Table that the content of $Fe_2O_3$ is 0 wt-% means that the content of $Fe_2O_3$ lies below the detection limit of the X-ray fluorescence analysis (XRF). In a particularly preferred embodiment this indication means that no $Fe_2O_3$ is present in the clinker substitute according to the invention.

In a further particularly preferred embodiment, the clinker substitute or calcined clay according to the invention comprises the following components:

| | |
|---|---|
| $SiO_2$   | 71 ± 3.0% |
| $TiO_2$   | 1.7 ± 0.50% |
| $Al_2O_3$ | 21 ± 2.0% |
| $Fe_2O_3$ | 0.0% |
| $Fe_3O_4$ | 2.8 ± 1.2% |
| CaO       | 0.50 ± 0.25% |
| MgO       | 0.60 ± 0.25% |
| $K_2O$    | 1.3 ± 0.50% |
| $Na_2O$   | 0.45 ± 0.25% |

The clinker substitute according to the invention preferably is used as partial replacement of Portland cement clinker for the production of Portland cement (CEM I) or Portland additive cement. Mortar and concrete can be produced therefrom.

Portland cement clinker and Portland cement (CEM I) are defined in the standard DIN EN 197-1 (German version: 2000).

Preferably, the cement according to the invention, preferably Portland cement or Portland additive cement, contains a clinker substitute which contains 60 to 90 wt-% conventional cement clinker (preferably Portland cement clinker) and 10 to 40 wt-% clinker substitute according to an embodiment of the invention, wherein the sum of the weight percentages of the conventional cement clinker and of the clinker substitute according to an embodiment of the invention is 100 wt-%.

Beside the clinker substitute according to an embodiment of or the cement clinker according to an embodiment of the invention, the cement according to an embodiment of the invention preferably also contains gypsum and/or anhydrite.

Preferably, 10 to 40 wt-%, more preferably 15 to 35 wt-%, even more preferably 20 to 30 wt-%, most preferably 22 to 28 wt-%, and in particular 24 to 26 wt-% of the total mass of cement are replaced (substituted) by the cement clinker according to an embodiment of the invention.

In a particularly preferred embodiment, 25 wt-% of the total mass of cement are replaced by the cement clinker according to an embodiment of the invention.

Preferably, the cement clinker is Portland cement clinker. The cement preferably is Portland cement or Portland additive cement.

In a preferred embodiment, the cement according to the invention contains no water (dry cement). In a further preferred embodiment, the cement according to the invention contains water, preferably in such a quantity that it can be employed for the respective use (ready-made).

The cement according to the invention preferably is suitable for the production of construction materials such as mortar and concrete.

A further subject-matter of an embodiment of the invention relates to mortar containing
the clinker substitute according to the invention as defined above,
the cement clinker according to the invention as defined above, or
the cement according to the invention as defined above.

Preferably, the mortar according to an embodiment of the invention is wall mortar, plaster, floor mortar or tile adhesive.

The mortar according to an embodiment of the invention preferably contains aggregate materials, such as sand, fine gravel or wood chips or any mixture thereof. The mortar according to an embodiment of the invention in particular contains sand.

Preferably, the maximum grain of the rock grain size of the used aggregate materials sand and fine gravel is about 4 mm. The standard EN 13139:2002 discloses the rock grain size for mortar.

In a preferred embodiment, the mortar according to the invention contains no water (dry mortar). In a further preferred embodiment, the mortar according to the invention contains water, preferably in such a quantity that it can be employed for the respective use (ready-made).

A further subject-matter of an embodiment of the invention relates to concrete containing
- the clinker substitute according to the invention as defined above,
- the cement clinker according to the invention as defined above, or
- the cement according to the invention as defined above.

Preferably the concrete according to an embodiment of the invention is lightweight concrete, normal concrete, heavy concrete, reinforced concrete, prestressed concrete, fiber concrete or steel fiber concrete.

The concrete according to an embodiment of the invention preferably contains aggregate materials, such as normal aggregate, lightweight aggregate or heavy aggregate or any mixture thereof. In a preferred embodiment, the concrete according to the invention contains no water. In a further preferred embodiment, the concrete according to an embodiment of the invention contains water, preferably in such a quantity that it can be employed for the respective use (ready-made).

In the sense of this description the term "normal aggregate" comprises aggregates with a bulk density of 2200 to 3200 kg/m$^3$. Preferably, these are of course aggregate materials (e.g. sand with a preferred grain size up to 2 mm, gravel from river deposits and moraines, crushed stone, grit, crushed sand, filler, mineral powder) or artificial aggregate materials (e.g. blast furnace slag, crushed clinker, concrete grit).

In the sense of this description the term "lightweight aggregate" comprises aggregate materials with a bulk density <2200 kg/m$^3$. Preferably, these are natural lightweight aggregates (e.g. pumice, lava sand, lava gravel, diatomaceous earth) or artificial lightweight aggregates (e.g. expanded shale, expanded clay, foamed slag). Lightweight aggregates preferably are used for the production of lightweight concrete.

In the sense of this description the term "heavy aggregate" comprises aggregates with a bulk density >3200 kg/m$^3$. Preferably, these are natural aggregate materials (e.g. heavy spar, magnetite, hematite, limonite) or artificial aggregate materials (e.g. crushed stone, heavy-metal slags). Heavy aggregates preferably are used for the production of heavy concrete.

The standard EN 12620:2003-04 discloses the rock grain size for concrete.

A further embodiment of the invention provides a method for producing cement or a construction material containing cement, wherein the construction material preferably is mortar or concrete, comprising the step of: replacing 10 to 40 wt-%, preferably 15 to 35 wt-%, more preferably 20 to 30 wt-% and in particular 25 wt-% of a conventional cement clinker, preferably Portland cement clinker, by the clinker substitute according to an embodiment of the invention.

A preferred embodiment of this invention relates to a method for producing cement or a construction material containing cement, wherein the construction material preferably is mortar or concrete, comprising the step of: replacing 10 to 40 wt-%, preferably 15 to 35 wt-%, more preferably 20 to 30 wt-% and in particular 25 wt-% of a conventional cement, preferably Portland cement or Portland additive cement, by the clinker substitute according to an embodiment of the invention.

The conventional cement clinker preferably is a cement clinker on the basis of limestone (e.g. Portland cement clinker). Preferably, the conventional cement clinker hence contains limestone in a high concentration and thus also a high CaO content of usually >55 wt-%, in particular about 58 wt-% up to about 66 wt-%.

The conventional cement clinker can be a cement clinker which contains kaolin.

Preferably, the conventional cement clinker is Portland cement clinker.

In a preferred embodiment, the method according to the invention for producing the cement according to the invention comprises the following steps:
a) replacing 10 to 40 wt-%, preferably 15 to 35 wt-%, more preferably 20 to 30 wt-% and in particular 25 wt-% of a conventional cement clinker, preferably Portland cement clinker, by the clinker substitute according to the invention,
b) admixing gypsum or anhydrite.

If necessary, the mixture obtained in step b) can be ground. By means of this method, dry cement according to an embodiment of the invention preferably is obtained in powder form. The dry cement obtained in step b) can also be mixed with water, in order to preferably obtain ready-made cement.

In a further preferred embodiment, the method according to the invention for producing the cement according to an embodiment of the invention comprises the following step: replacing 10 to 40 wt-%, preferably 15 to 35 wt-%, more preferably 20 to 30 wt-% and in particular 25 wt-% of a conventional cement, preferably Portland cement or Portland additive cement, by the clinker substitute according to an embodiment of the invention. If necessary, the mixture obtained in this step can be ground. By means of this method, dry cement according to an embodiment of the invention preferably is obtained in powder form. The dry cement obtained can also be mixed with water, in order to preferably obtain ready-made cement.

In a preferred embodiment, the method according to the invention for producing the mortar according to an embodiment of the invention comprises the following step: mixing the cement according to the invention with aggregate material, preferably sand, fine gravel or wood chips or any mixture thereof. Preferably, the dry mortar produced by this method is converted into ready-made mortar by adding water.

In a preferred embodiment, the method according to the invention for producing the mortar according to an embodiment of the invention comprises the following steps:
a) replacing 10 to 40 wt-%, preferably 15 to 35 wt-%, more preferably 20 to 30 wt-% and in particular 25 wt-% of a conventional cement clinker, preferably Portland cement clinker, by the clinker substitute according to an embodiment of the invention,
b) admixing gypsum or anhydrite,
c) admixing aggregate material to the mixture obtained in step b), wherein the aggregate material preferably is sand, fine gravel or wood chips or any mixture thereof.

If necessary, the mixture obtained in step b) can be ground. By means of this method, the corresponding dry mortar according to an embodiment of the invention is produced.

In a further preferred embodiment, the method according to the invention for producing the mortar according to the invention comprises the following steps:

a) replacing 10 to 40 wt-%, preferably 15 to 35 wt-%, more preferably 20 to 30 wt-% and in particular 25 wt-% of a conventional cement, preferably Portland cement or Portland additive cement, by the clinker substitute according to an embodiment of the invention,
b) admixing aggregate material to the cement obtained in step a), wherein the aggregate material preferably is sand, fine gravel or wood chips or any mixture thereof.

If necessary, the mixture obtained in step a) can be ground. By means of this method, dry mortar is produced.

Preferably, the maximum grain of the rock grain size of the used aggregate materials sand and fine gravel is about 4 mm. The standard DIN EN 13139:2002 discloses the rock grain size for mortar.

In a particularly preferred embodiment, the aggregate material is sand.

By mixing the cement according to an embodiment of the invention with the aggregate material (sand, fine gravel or wood chips or any mixture thereof) without the addition of water, dry mortar according to an embodiment of the invention is obtained. By adding water to the dry mortar according to an embodiment of the invention, the ready-made mortar according to an embodiment of the invention is obtained.

In a preferred embodiment, the method according to the invention for producing the concrete comprises the following step: mixing the cement according to an embodiment of the invention with aggregate material, preferably normal aggregate, lightweight aggregate or heavy aggregate or any mixture thereof. Preferably, the dry concrete produced by this method is converted into ready-made concrete by the addition of water and subsequent mixing.

In a preferred embodiment, the method according to the invention for producing the concrete according to an embodiment of the invention comprises the following steps:
a) replacing 10 to 40 wt-%, preferably 15 to 35 wt-%, more preferably 20 to 30 wt-% and in particular 25 wt-% of a conventional cement clinker, preferably Portland cement clinker, by the clinker substitute according to an embodiment of the invention,
b) admixing gypsum or anhydrite,
c) mixing the mixture obtained in step b) with aggregate material, preferably normal aggregate, lightweight aggregate or heavy aggregate or any mixture thereof.

If necessary, the mixture obtained in step b) can be ground. Preferably, water is added to the mixture obtained in step c), in order to obtain ready-made concrete.

In a further preferred embodiment, the method according to the invention for producing the concrete according to an embodiment of the invention comprises the following steps:
a) replacing 10 to 40 wt-%, preferably 15 to 35 wt-%, more preferably 20 to 30 wt-% and in particular 25 wt-% of a conventional cement, preferably Portland cement or Portland additive cement, by the clinker substitute according to the invention,
b) mixing the cement obtained in step a) with aggregate material, preferably normal aggregate, lightweight aggregate or heavy aggregate or any mixture thereof.

If necessary, the mixture obtained in step a) can be ground. Preferably, water is added to the mixture obtained in step b), in order to preferably obtain ready-made concrete.

In this connection, the terms "normal aggregate", "lightweight aggregate" and "heavy aggregate" are used as already defined above. The method steps "mixing" and "grinding" mentioned in the methods disclosed above can be carried out with all suitable devices for mixing and grinding. Suitable devices are known to the skilled person. For example, for grinding in the cement production a ball mill preferably is used. In the production of the above-mentioned construction materials concrete mixers or drum mixers can be used.

The cement according to an embodiment of the invention, the mortar according to an embodiment of the invention and the concrete according to an embodiment of the invention are suitable in particular for building structures.

A further embodiment of the invention provides a structure containing the clinker substitute according to an embodiment of the invention as defined above, the cement clinker according to an embodiment of the invention as defined above, the cement according to an embodiment of the invention as defined above, the mortar according to an embodiment of the invention as defined above and/or the concrete according to an embodiment of the invention as defined above.

In the sense of this description, the term "structure" preferably comprises buildings (e.g. residential house, skyscraper, church, factory hall, stable, greenhouse, warehouse, garage), traffic structures (e.g. bridge, street, tunnel, gallery), supply and waste disposal structures (e.g. water and sewage conduits, chimneys, sewage disposal plants, dike, retaining dam, masonry dam, weir, transmission towers, transmission masts, aerial line masts), protective buildings (e.g. protective rampart, protective dam, avalanche control, gallery, shelter), defense and fortification systems (e.g. fortification, defense tower) and temporary structures.

EXAMPLES

Material Used

The clay was obtained from a clay pit in Southern Brandenburg (Germany).

Pretreatment

The material was dried over night at 70° C. in a drying cabinet. The dried clay was ground in a jaw crusher to a particle size of less than 6 mm and subsequently ground in a disk mill to a particle size of less than 1 mm. The comminuted clay particles were screened and material with a particle size of less than 1 mm was used for the further testing procedures.

Chemical Composition and Physical Parameters

The chemical composition of the samples was determined by X-ray fluorescence analysis (XRF). The results of this analysis are shown in the following Table:

| | |
|---|---|
| $SiO_2$ | 71.71% |
| $TiO_2$ | 1.72% |
| $Al_2O_3$ | 20.90% |
| $Fe_2O_3$ | 2.81% |
| CaO | 0.51% |
| MgO | 0.63% |
| $K_2O$ | 1.29% |
| $Na_2O$ | 0.43% |

The loss on ignition (LOI) indicates the loss of mass of the sample due to the release of volatile substances (the sample was heated to 1050° C., until a constant weight loss was detected). In the case of clay, the volatile substances chiefly comprise water and for a small part carbon dioxide. The specific gross weight of the samples was determined to be 1.13 kg/l.

Particle Size Distribution

The particle size distribution was determined with a screen tower in conjunction with an air-swept screen for small particles smaller than 100 μm. The clay had a mean particle diameter d20 of 100 μm, d50 of 192 μm and a Sauter diameter dSauter of 130 μm.

Production

The reactor comprises a steel tube with an inside diameter of 80 mm and a height of 1.5 m. The reactor shell contains three independently controlled electric heating systems. Cyclone 1 and cyclone 2 are insulated and electrically heated. The clay starting material is introduced with a metering screw. The product is discharged semi-continuously through a ball valve at the bottom of the reactor. Fluidizing gas is introduced and analysed with flow meters. The gas is electrically heated to about 650° C. and then flows through the grating. Additional air (purge gas) is let in at six different points in small quantities. The waste gas is guided to a waste gas filter.

The temperatures are measured at three different points at different heights of the reactor and in the recycle cyclone by means of Ni—Cr—Ni heating elements. The retention time and execution of the manual product withdrawal are controlled by measuring the pressure difference between the upper and the lower end (above the nozzles) of the reactor. The absolute pressure inside the reactor is approximately atmospheric.

The reactor and the cyclones are inspected and cleaned before each test series. The apparatus was subsequently heated up. After the desired temperature has been reached, the clay starting material was introduced into the reactor by means of a metering screw. After the desired pressure difference in the reactor has been reached, the ball valve was opened for a short time, in order to discharge the product (semi-continuous withdrawal).

The reactor subsequently was operated for approximately one hour at the desired pressure difference, in order to obtain a homogeneous product concentration with sufficient retention time. Samples were taken from the bed and the second cyclone.

Results a) Test Parameters

The calcination could be carried out by means of the desired test parameters.

The following Table provides an overview of the test parameters (average values under steady-state conditions):

|  |  | Test 1 | Test 2 | Test 3 | Test 4 |
|---|---|---|---|---|---|
| Temperature | ° C. | 650 | 700 | 750 | 850 |
| Δp | mbar | 21 | 21 | 21 | 20 |
| Feed rate | kg/h | 1.4 | 3.0 | 3.0 | 2.8 |
| V. air | Nm³/h | 2.2 | 2.2 | 2.2 | 2.2 | b) Retention Time and Gas Velocity

The retention time τ was calculated as follows:

$$\tau = \frac{dp \cdot A}{g \cdot m_R},$$

wherein

τ: retention time [min]
dp: pressure difference over the reactor height [Pa]
A: diameter of the CFB [m²]; A=0.005 m²
g: gravitational acceleration m$_R$: mass flow rate of the charge or actual withdrawal [kg/min]

The calculated retention times based on the input of material are
  45 min for Test 1
  22 min for Tests 2, 3 and 4.

c) Loss on Ignition after Calcination

The loss on ignition (LOI) was determined for all calcined clay samples which were taken from the bed. The test specimens were heated to 1050° C. and left under these conditions, until a constant weight loss was detected.

In all measurement series, the loss on ignition in the product is less than 1 wt-% and decreases with increasing temperature. The loss on ignition for the material taken from the cyclone is greater due to the reduced retention time of the material. At 700° C. bed material and cyclone material have approximately identical values. It was found that there is a trend towards a decreasing loss on ignition with increasing temperature.

d) Compressive Strength of the Mortar Samples According to DIN EN 196-1

The calcined clay samples produced by the above method were tested for mortar compressive strength after 7 and 28 days corresponding to DIN EN 196-1 (German version: 1994).

The strength test was carried out according to DIN EN 196-1 (German version: 1994). In the standard mixtures, the cement was each substituted for 25% by the material samples. The mortar samples were produced according to DIN EN 196-1 (German version: 1994). The testing area for the compressive strength test (carried out on half prisms) was 40×40 mm after 7 days corresponding to DIN EN. After 28 days, the testing machine had to be changed due to the high sample strength and thus the changed testing range, wherein the testing area now was 40×65 mm. A smaller testing area in general leads to higher strength values. However, since the reference samples of 100% cement were tested in the same way, nothing is changed in the statement as to the quality of the material. As cement—contrary to the standards and test specifications—a CEM 152.5 R was used instead of a CEM I 42.5 R.

Figure 2:
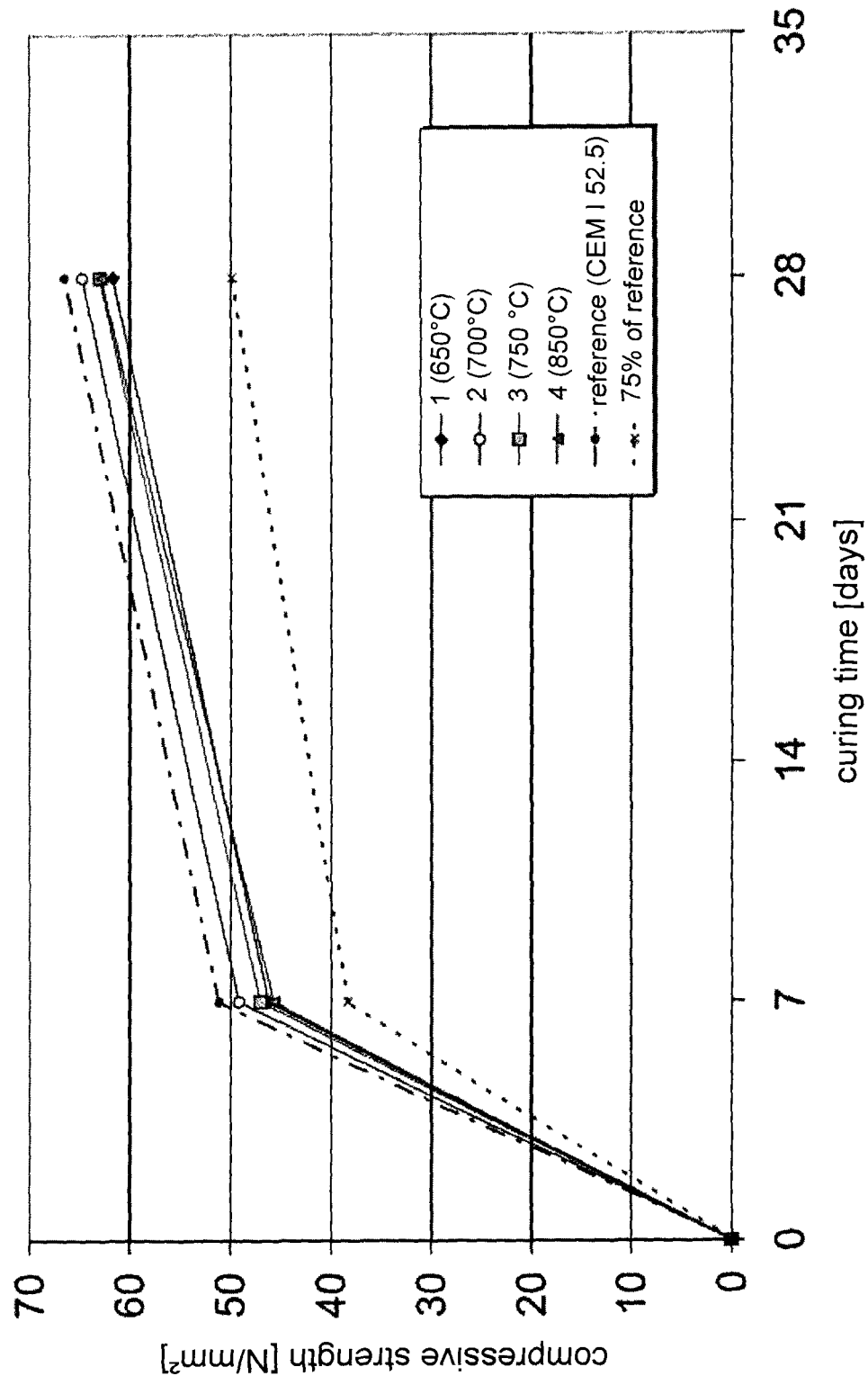
FIG. 2 shows a diagram of the compressive strength of the mortar according to the invention in dependence on the curing time and the calcining temperature.

FIG. 2 shows the results of the compressive strength test of the mortar prisms after 7 and 28 days.

As a result it was found that all mortar samples satisfy the strengths for an additive cement CEM II 52.5 required according to DIN EN 196-1 after 28 days, i.e. all individual values lie above 52.5 N/mm² and the mean values lie above 61N/mm². Of the mortars, sample 2 (700° C.) shows the highest strength, after 28 days with 65 N/mm². The criteria to achieve 70% and 75%, respectively, of the cement strengths (specification corresponding to the DIBt approval principles for additives or ASTM C618-05) were satisfied by all materials both after 7 and after 28 days.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 pretreatment
2 first preheating stage
3 second preheating stage
4 calcining furnace
5 dedusting
6 reduction furnace
7 first cooling stage
8 second cooling stage
9 combustion chamber
9a first stage
9b second stage

The invention claimed is:

1. A method for producing a clinker substitute for use in cement production, the method comprising:
   a) predrying clay with an iron content >1.5 wt-% in a form of iron oxides and a kaolinite content <40 wt-% to a moisture <10 wt-%;
   b) comminuting the clay to a grain size <2 mm;
   c) calcining the clay by thermal treatment in a furnace at a temperature of 600 to 1000° C.;
   d) thermally treating the clay under reducing conditions at a temperature of 600 to 1000° C. so as to form a reduction product;
   e) intermediately cooling the reduction product to a temperature <300° C.; and
   f) finally cooling the reduction product.

2. The method according to claim 1, wherein the clay in step a) has a CaO content >0.1 wt-%.

3. The method according to claim 1, wherein the intermediate cooling of the reduction product in step e) is effected under oxygen exclusion.

4. The method according to claim 1, wherein, during the intermediate cooling of the reduction product in step e), oil is introduced as an additional reducing agent.

5. The method according to claim 1, wherein the calcination in step c) is effected in a fluidized-bed reactor, a rotary kiln, a suspension calciner or a multiple-hearth roaster.

6. The method according to claim 1, wherein in an external combustion chamber a fuel is burnt and a combustion product produced is used for carrying out the thermal treatment in at least one of steps c) and d).

7. The method according to claim 6, wherein the combustion is carried out in a plurality of stages including at least one first stage in which the combustion is effected under reducing conditions and at least one second stage in which the combustion is effected under oxidizing conditions.

8. The method according to claim 7, wherein a combustion product produced in the at least one first stage is used as reduction gas during the thermal treatment in step d).

9. The method according to claim 7, wherein a combustion product produced in the at least one second stage is used as hot gas during the calcination in step c).

10. The method according to claim 1, wherein the clay is preheated in one or more preheating stages prior to the calcination.

11. A clinker substitute containing calcined clay, wherein the calcined clay is derived from calcination of a clay that contains <40 wt-% kaolinite and >1.5 wt-% iron in a form of iron oxides, and wherein >90 wt-% of the iron oxides contained in the clay are present as magnetite ($Fe_3O_4$).

12. The clinker substitute according to claim 11, wherein the clay contains no hematite ($Fe_2O_3$).

13. The clinker substitute according to claim 11, wherein the clay contains >0.1 wt-% CaO.

14. The clinker substitute according to claim 11, wherein no limestone or no kaolin is added to the clay.

15. The clinker substitute according to claim 11, wherein the clinker substitute is present in cement, mortar or concrete.

16. Cement containing the clinker substitute according to claim 11.

17. Mortar or concrete containing the cement according to claim 16.

18. A method for producing a cement clinker or a construction material containing the cement clinker, wherein the construction material is cement, mortar or concrete, comprising the step of replacing 10 to 40 wt-% of a conventional cement clinker by the clinker substitute according to claim 11.

19. A structure containing the mortar or cement according to claim 16.

* * * * *